Feb. 6, 1934.   J. C. DALEY   1,945,802
RADIO TUBE TESTER
Filed Aug. 10, 1925   4 Sheets-Sheet 1
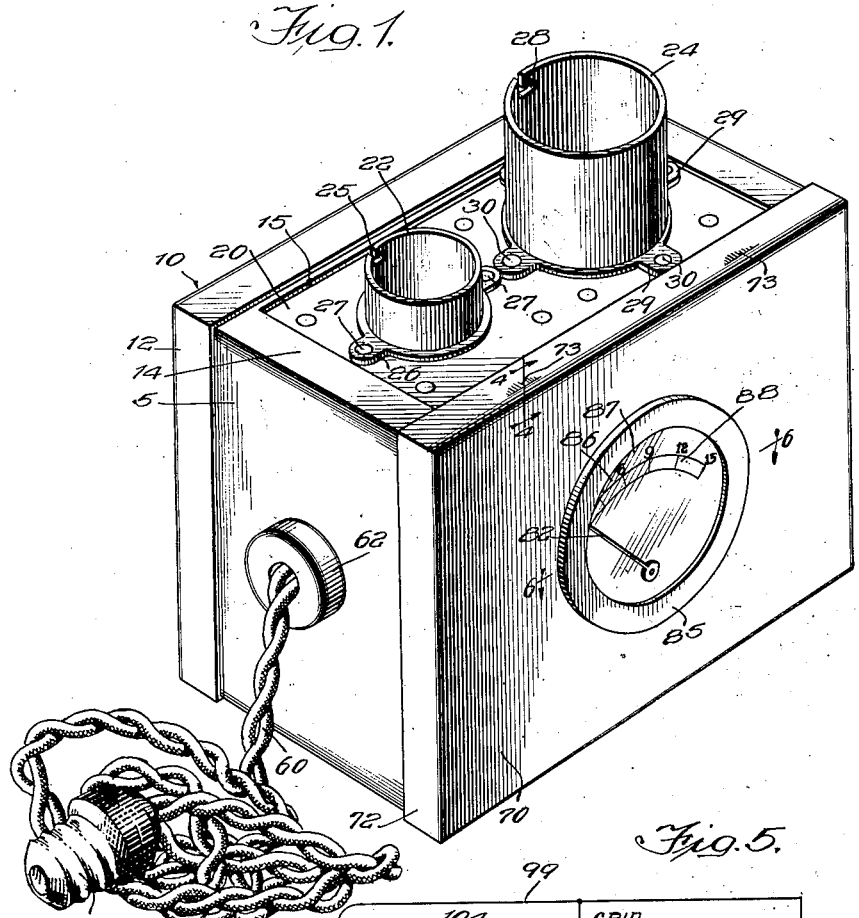
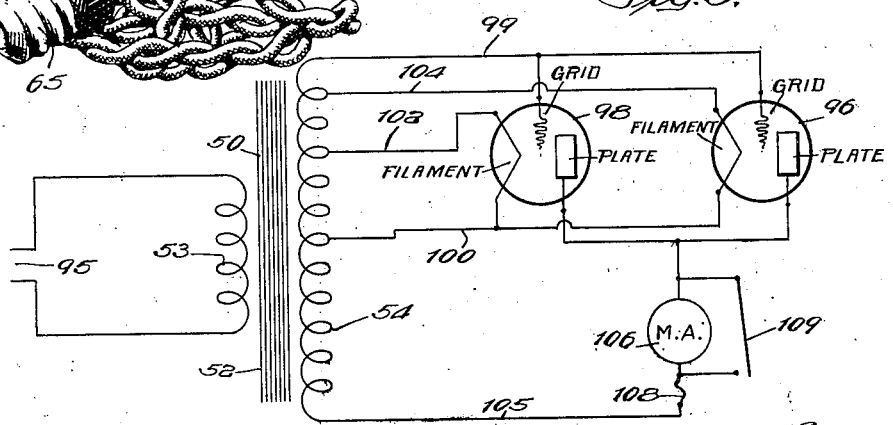
Witnesses:
William P. Kilroy
Harry R. L. White
Inventor:
James C. Daley
Brown, Boettcher & Brenner
Attys Feb. 6, 1934.     J. C. DALEY     1,945,802
RADIO TUBE TESTER
Filed Aug. 10, 1925     4 Sheets-Sheet 2
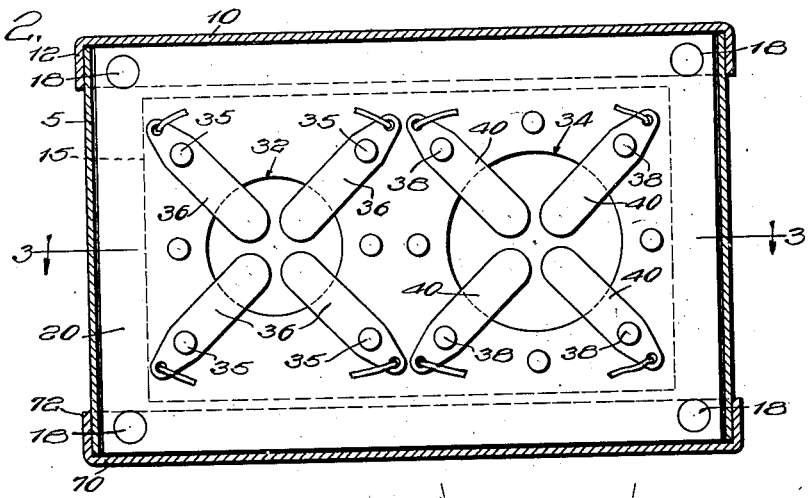
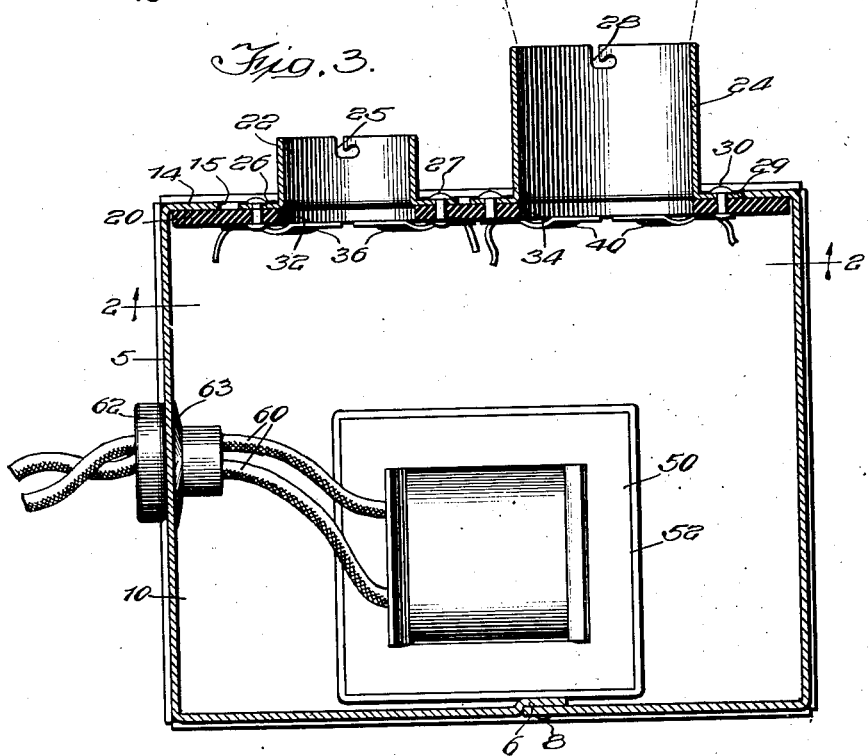
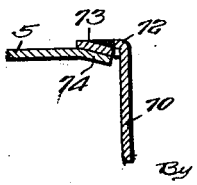
Witnesses:
William P. Kilroy
Harry R. L. White
Inventor:
James C. Daley
By Brown, Boettcher & Dienne
Attys.

Feb. 6, 1934.　　　　J. C. DALEY　　　1,945,802
RADIO TUBE TESTER
Filed Aug. 10, 1925　　　4 Sheets-Sheet 3
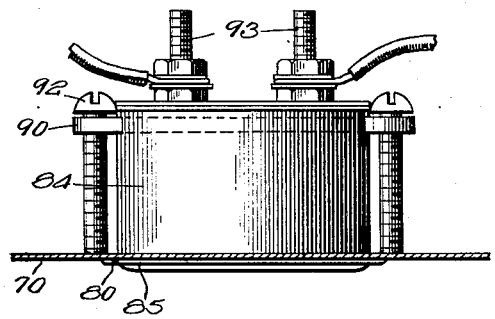
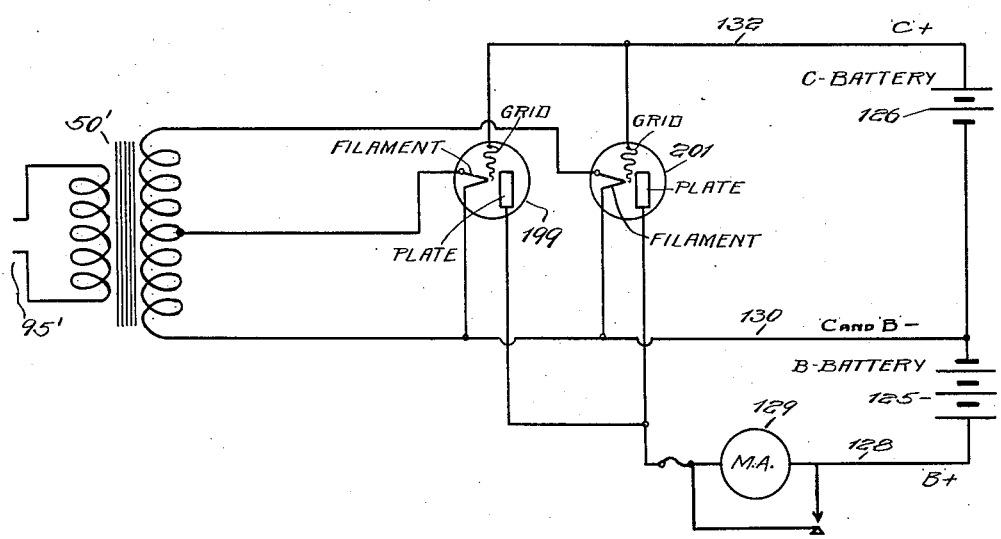

Feb. 6, 1934.  J. C. DALEY  1,945,802
RADIO TUBE TESTER
Filed Aug. 10, 1925  4 Sheets-Sheet 4

Witnesses:
William P. Kilroy
Harry R. L. White

Inventor:
James C. Daley
By Brown, Boettcher & Dienner
Attys.

Patented Feb. 6, 1934

1,945,802

UNITED STATES PATENT OFFICE 1,945,802

RADIO TUBE TESTER

James C. Daley, Chicago, Ill., assignor, by mesne assignments, to Jewell Electrical Instrument Company, a corporation of New Jersey Application August 10, 1925. Serial No. 49,469

14 Claims. (Cl. 250—27)

This invention relates to testing means for radio tubes, and the like.

As pointed out in my co-pending application, Serial No. 49,468, filed August 10, 1925, which issued as Patent No. 1,608,083, dated November 23, 1926, radio tubes become exhausted or paralyzed from use or excessive filament voltages, the deterioration, or loss in efficiency of the tube beginning with its first use. The disadvantages of this are more fully pointed out in the above patent which provides for reconditioning or rejuvenating the tube to increase its effective life or bring it up more nearly equal to normal.

The present invention provides a device for testing the tube to determine whether or not it is up to normal and if not to what degree it is below normal. Sub-normal or improperly functioning tubes may, therefore be readily ascertained and upon being reconditioned may again be tested to ascertain the degree of improvement, and determine the electrical characteristics of the tube.

The objects of my present invention are the provision of a generally improved and simplified construction that may be economically produced, and a compact device that may be used conveniently and which will give an accurate reading with the indicating element having sufficiently great movement to permit relatively large graduations so that reading is facilitated, and a sufficient degree of accuracy is secured.

Another object of the invention is the provision of an improved method of testing thermionic tubes, which method is inherent in the operation of the devices described hereinafter, as will be apparent from the description of the invention and the functions of its parts.

To acquaint those skilled in the art with the construction and manner of practicing my invention, I shall now describe the same in connection with the accompanying drawings forming a part hereof, and in which:

Figure 1 is an isometric view of an embodiment of the invention;

Fig. 2 is a horizontal section taken on the line 2—2 of Fig. 3, and looking up in the direction of the arrows;

Fig. 3 is a vertical section taken on the line 3—3 of Fig. 2;

Fig. 4 is a detail vertical section taken on the line 4—4 of Fig. 1;

Fig. 5 is a circuit diagram;

Fig. 6 is a detail section taken generally on the line 6—6 of Fig. 1, with the meter and its mounting in elevation;

Fig. 7 is another circuit diagram;

Figure 8:
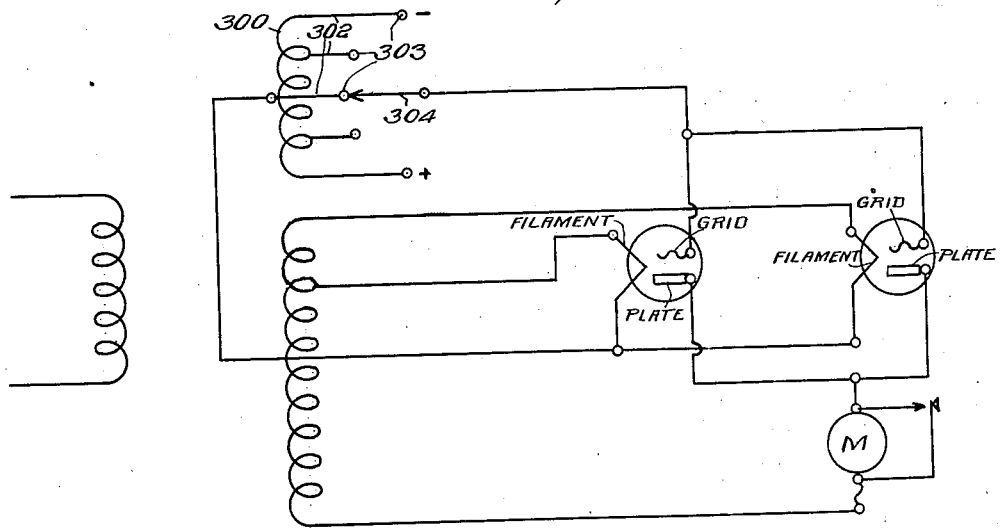
Fig. 8 is a circuit diagram showing means for varying the grid potential from negative through zero to positive.

The device shown comprises a container 5 of generally rectangular formation with an open back and front. This container 5 may be formed of sheet metal or any other suitable or preferred material, the free ends of the stock making a lap joint at 6 and adapted to be fastened together along said joint as by means of rivets 8.

The open back of the container 5 is closed by a back member 10, which may also be of sheet metal or other suitable material, and this back member 10 has a lateral flange 12 surrounding the rear edge of the container 5, the back member 10 being adapted to be secured to the rear of the container by fastening this flange to the adjacent edge of the container, or in any other suitable manner.

The top 14 of the container has a relatively large opening 15 just sufficient of the top being left to provide a frame about said opening 15. Underlying the top 14 and secured marginally thereto as by means of rivets 18 is a panel 20 of bakelite or other suitable insulating material. This panel 20 closes the open top of the container and supports the tube sockets 22 and 24 insulated from each other and from the container.

The tube socket 22 comprises a sleeve having a bayonet slot 25 at its upper edge for securing the tube therein, and at its lower edge are a plurality of radial feet or lugs 26 through which the socket 22 is secured, as by means of rivets 27 to the insulating panel 20. The socket 24 similarly comprises a sleeve having a bayonet slot 28 at its upper edge for securing the tube therein, and its lower edge is similarly provided with integral radial feet or lugs 29 through which the socket 24 is secured to the insulating panel, as by means of rivets 30. The sockets 22 and 24 are mounted over openings 32 and 34, respectively, through the insulating panel 20. Secured to the underside of the insulating panel 20 as by means of rivets 35 are a plurality of spring contact fingers 36, the free ends of which extend radially beneath the opening 32 for proper electrical contact with the filament, plate, and grid contacts of the tube upon insertion of the same into the socket 22. Similarly secured to the underside of the insulating panel as by means of rivets 38 are a plurality of spring contact fingers 40, the free ends of which extend radially beneath the opening 34 for proper electrical contact with the filament, grid, and plate contacts of the tube upon insertion of the same into the socket 24.

Housed within the container 5 is a transformer 50 which may be of the type more fully disclosed in the co-pending application of Morris M. Fulton, Serial No. 737,958, filed September 15, 1924, or it may be of any other suitable or preferred type. It is shown as comprising suitable core pieces 52 and, as shown in the circuit diagram of Fig. 5, a primary winding 53 and a secondary winding 54. The transformer, and the leads and connections to it, may be sealed within the container 5 by a suitable insulating compound (not shown).

The transformer 50 is supplied from a source of alternating current, by means of conductors 60. These conductors 60 are led out from the container through an insulating bushing 62 suitably secured, as by means of a washer 63 in an opening in one of the side or end walls of the container 5. The outer end of the conductor 60 may be provided with a connector 65 of the plug, prong, or other suitable type for connecting the transformer with the desired source.

The open front of the container 5 is closed by a front closure or cover 70, the margin of which is turned laterally to provide a flange 72 which surrounds the adjacent edge of the container when the cover 70 is in place thereon. Lugs or lips 73 may be struck in from the flange 72 for co-operation with lugs or lips 74 struck in from the adjacent edge of the container, as shown in detail in Fig. 4, to detachably secure the cover in place or the cover may be permanently or otherwise secured as desired.

The cover 70 has an opening 80 and secured in this opening 80 is the meter or indicating device. The meter per se may be of any suitable or preferred type having, for example, the usual coil and magnet means for swinging the pointer 82 when the circuit through the device is closed. The meter is enclosed in a shell or cup 84 which passes through the opening 80 and has at its outer end a bezel flange 85 for limiting the movement of the shell 84 through the opening 80. Suitably secured at the outer end of the shell 84 is a pane 86 behind which is a dial 87 over which the pointer 82 plays. The dial 87 is provided with a scale 88, the divisions of which are uniformly separated and sufficiently spaced to provide a convenient and accurate reading. In the particular device which I have provided the meter is adapted to indicate in milliamperes the current flowing between the plate and filament of the tube, which current flow indicates the amplification and operating characteristic of the tube.

The socket or connector 24 is shown as being adapted for mounting tubes of the U. V. 201 A and C. 301 A type, while the socket or connector 22 is shown as being adapted for mounting tubes of the U. V. 199 and C. 299 type, although this may, of course, be varied, as desired.

Inwardly of the cover 70 the shell 84 has radial lugs 90. Screws 92 threaded through these lugs 90 and into engagement with the inner surface of the cover 70 draw the shell 84 inwardly, binding the flange 85 firmly against the outer surface of the cover and thereby the shell and entire meter firmly in the opening 80. At its inner end the meter is also provided with suitable terminal means 93 for electrically connecting it in circuit with the socket or connector members 22 and 24.

Referring to the circuit diagram of Fig. 5, the primary 53 of the transformer is supplied from a suitable source 95, of alternating or pulsating current. A tube of the U. B. 201 A or C. 301 A type is indicated at 96 in Fig. 5. A tube of the U. V. 199 or C. 299 type is indicated at 98. It is to be understood that these are merely illustrative and that the invention is not limited to use in connection with any particular type of tube. The circuit through either tube is completed by insertion of that tube into its particular socket 22 or 24 and is discontinued by removal of the tube from the socket. One tube is tested at a time and is placed in either socket 22 or 24 according to its type, the combination of these two types of sockets permitting use of the device in connection with various types and sizes of tubes. A common conductor 99 extends from one end of the secondary 54 to the grid contacts of the two sockets. A common conductor 100 extends from the secondary 54 to one of the filament contacts of each socket. A conductor 102 connects the other filament contact of the socket 22 with the secondary 54 and a conductor 104 connects the other filament contact of the socket 24 with the secondary 54. A conductor 105 leads from the secondary 54 to the two plate contacts, one for each of the sockets 22 and 24, and it is in this last line that the meter is connected to indicate the plate current flow between the plate and filament of the tube when the circuits through the filament and to the plate and grid are completed. The meter is indicated diagrammatically at 106 in Fig. 5.

For the purpose of protecting the meter 106 I provide a fuse 108 in circuit therewith and a protective switch 109 connected around the meter. With a tube in place, the switch 109 is closed and a flow of current takes place through the fuse circuit. Then by opening the switch 109 the entire current flow takes place through the fuse and meter, to give the desired indication. From the foregoing it will be apparent that the common current source 95 acts through the transformer 50 to light or heat the filament of the tube and, at the same time, to supply the grid and plate circuit potential the plate circuit being through the meter to indicate the electrical characteristics of the tube. The E. M. F. applied to the filament, plate and grid terminals may be varied as required for the use of different types of tubes, or for the different characteristics of the tube.

In the diagram of Fig. 7 the alternating current or other source 95' again, through the transformer 50', serves to heat or light the filament of the tubes. In this case, however, the grid and plate circuits are supplied from the combination C and B battery hook-up shown. The B battery is indicated at 125 and the C battery at 126. The positive side of the B battery is connected through a conductor 128 in which the meter fuse and protective shunt 129 is connected with the plates of the tubes. The negative side of the B battery and one side of the C battery are connected through conductor 130 with one of the filament contacts of each tube. The plus or minus or opposite side of the C battery is connected by means of a conductor 132 with the grid contacts of the tubes and the desired bias is placed on the grids therethrough. The operation and use of this embodiment is substantially the same as the other, with the exception that the plate current and grid potential are from battery instead of the common A. C. source 95', the amount of current drawn by the plate circuit indicating, as before, in milliamperes the electrical characteristics of the tube. If below normal the tube may be reconditioned and again tested to ascertain the degree of improvement. A paralyzed tube gives as low a reading as zero while tubes of the U. V. 201 A or C. 301 A type will usually give about a ten milliampere reading, when in normal working condition. The U. V. and C. 199 tubes usually read in the neighborhood of from five to six milliamperes when in normal condition.

The grids of the two tubes may be so connected to their respective filaments or to an additional winding on the transformer, so as to vary the readings on the milliammeter which will indicate to some extent the characteristic plate current, grid potential curve of the tube, varying it from a negative grid potential through zero to a positive potential.

In Figure 8, I have shown the grids connected to an additional winding 300 for this purpose, the winding 300 having leads 302 provided with contacts 303 and there being a switch arm 304 for varying the grid potential from negative step by step as desired through zero to a positive grid potential.

Figure 9:
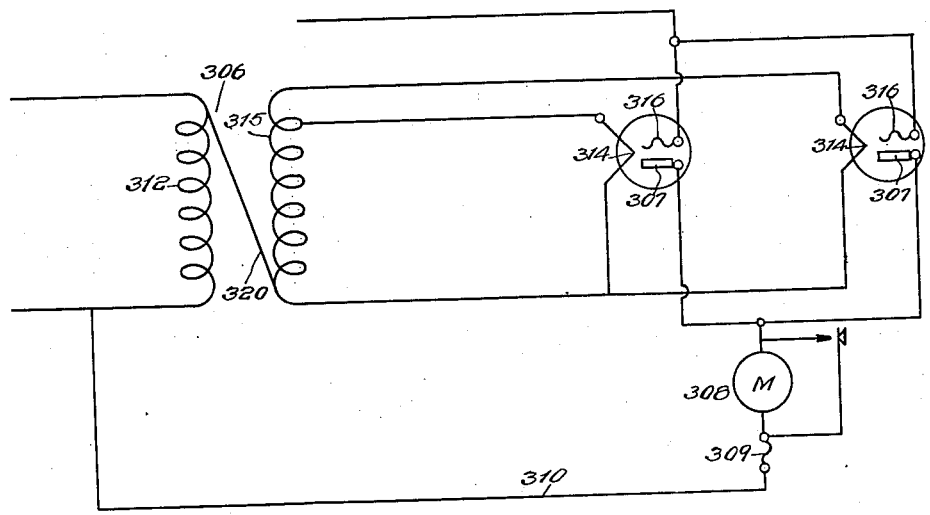
Fig. 9 is circuit diagram showing the use of an autotransformer with an embodiment of the present invention.

In Figure 9 I have shown the employment of an autotransformer 306 in a system embodying my present invention. The interconnected plates 307 are connected through the meter 308, fuse 309 and a conductor 310 with the primary winding 312, with the filaments 314 connected with the secondary winding 315, as shown. The grids 316 may be connected with the secondary winding or with an additional winding and the secondary and primary windings are connected as indicated at 320.

It is to be understood that in the embodiment of Fig. 9, the drawings show a further variation of Fig. 8, and the wiring diagram is completed by reference to Fig. 8. The grid voltage may thus be varied in any of the forms of the device by changing the connection to the filament, to the secondary winding, or to an additional tapped winding, as shown in Fig. 8.

The electrical circuits of the device constitute an electrical network having different potentials at different points in the network and the voltage applied to the grid depends upon the potential of the point of connection of the grid to the network. The potential varies from point to point in the network and the grid voltage may be changed initially by the connection of the disconnected grid to the network or the change of the connection from one point to another spaced point in the electrical network. The term "electrical network" is applied broadly in the present specification and claims to any structure of network which may be used to operate the mechanism.

While I have described the invention in connection with certain particular embodiments, it is to be understood that I do not intend to be limited to the precise details and manner of use disclosed, nor to the use of the invention in connection with any particular type of tube.

I claim:

1. The method of testing an audion tube which comprises energizing the plate and filament circuits from an alternating current source, serially impressing upon the grid different alternating voltages, and indicating the magnitude of plate current established by each of the applied grid voltages.

2. In an audion tube tester, an electrical network for connection between a source of alternating current and an audion, said network comprising elements for establishing circuits to energize the audion filament and plate circuits from said source, and circuit elements including a switch for alternatively impressing upon the grid the alternating voltages established at two spaced points in said network by said source.

3. In an audion tube tester, a transformer having a primary winding adapted to be connected across a source of alternating current and a secondary winding adapted to energize the audion filament circuit, connections from opposite terminals of said primary winding to a filament and the plate terminal, respectively, and means for alternatively connecting said grid to two points in the electrical network which are at different alternating potentials.

4. The method of testing an audion tube which comprises energizing the filament, plate and grid circuits from a source of alternating current, indicating the plate current established by the applied alternating current grid bias, changing the magnitude of the applied grid voltage, and indicating the plate current established by such change of the energizing voltages.

5. The method of testing an audion tube which comprises applying alternating current to the plate and filament circuits, serially impressing upon the grid voltages of different magnitudes derived from the source which supplies alternating current to said plate and filament circuits, and indicating the magnitude of the plate current established by each of the applied grid voltages.

6. In the process of testing an audion tube by energizing the filament, plate and grid circuits from a source of alternating current; the method which comprises supplying the plate and filament circuits with alternating current from said source; alternatively impressing upon the grid, during half-cycles when the plate potential is positive, bias voltages of different magnitudes and derived from said source; and indicating the magnitude of the plate current established by each of the applied grid bias voltages.

7. In an audion tube tester, an electrical network for connection between a source of alternating current and an audion, said network comprising elements establishing circuits for supplying alternating current to the audion filament and plate, and circuit elements including a switch for alternatively impressing upon the grid bias voltages of different magnitudes determined by the alternating potentials established by said source at two spaced points in said network.

8. A tube testing apparatus comprising a source of alternating current, an electrical network for connection between the source of alternating current and an audion tube, said network including a lead from the grid, a grid switch connected to said lead and contacts connected to points of different potential in said network and adapted to cooperate with said switch, whereby grid bias voltages of different magnitude may be impressed upon the grid by connection with two spaced points in said network.

9. The method of testing an audion tube which comprises energizing the filament, plate and grid circuits from a source of alternating current, indicating the plate current established by the applied alternating current grid bias, changing the phase relationship of the applied plate and grid voltages, and indicating the plate current established by such change of the energizing voltages.

10. The method of testing an audion tube which comprises energizing the plate and filament circuits from a source of alternating current, and alternatively connecting the grid to two spaced points in one of said energizing circuits, whereby different biasing voltages are applied to the grid.

11. An audion tube tester comprising a source of alternating current, circuit elements extending from opposite terminals of said source to the plate and filament of a tube to form a plate energizing circuit, a filament circuit including means energized by said source for impressing an appropriate voltage across the tube filament terminals, and means for alternatively connecting the grid to two spaced points in one of said circuits, whereby different bias voltages may be impressed upon said audion.

12. In an audion tube tester, a step-down transformer having a primary adapted to be connected across an alternating current source and a secondary adapted to energize an audion filament, a plate circuit in parallel with said transformer primary, a filament circuit connected across said secondary, and means for alternatively connecting the audion grid to two spaced points in one of said circuits.

13. A tube testing device comprising a transformer having means for connecting the primary thereof across an alternating current source, a pair of tube sockets adapted to receive vacuum tubes having different characteristics, the several sockets having their filament terminals so connected with the secondary of said transformer that each socket will receive from said secondary a filament voltage of predetermined value and the filament voltage of one socket will differ from the filament voltage of the other socket, said tube sockets also having their grid terminals connected with said secondary, a plate circuit connecting the plate terminals of the several tube sockets with the said alternating current source, and a current indicating device in said plate circuit.

14. In a universal tester for audion tubes of different types, a plurality of tube sockets, in any one of which a tube for test may be connected, electrical circuits for energizing the filament, plate, and grid elements of tubes to be tested from a common source of alternating current supply, a transformer, the secondary winding of which is divided into sections, whereby the windings of which of different extent may be included in the grid circuits of different sockets whereby different grid voltages may be impressed upon the grids of tubes when in different sockets of the series.

JAMES C. DALEY.